June 3, 1924. 1,495,996

E. FOWLER ET AL

SHACKLE

Filed July 13, 1922

Inventors
Edward Fowler
and
John V. Lewis
By Knight & Gray
Attorneys

Patented June 3, 1924.

1,495,996

UNITED STATES PATENT OFFICE.

EDWARD FOWLER AND JOHN V. LEWIS, OF ST. ELMO, TENNESSEE.

SHACKLE.

Application filed July 13, 1922. Serial No. 574,850.

*To all whom it may concern:*

Be it known that we, EDWARD FOWLER and JOHN V. LEWIS, both citizens of the United States, residing at St. Elmo, in the county of Hamilton and State of Tennessee, have invented certain new and useful Improvements in Shackles, of which the following is a specification.

Our invention relates to shackles for operatively connecting a drawn element, such as an agricultural implement or the like, and a pulling element, such as a horse or motor drawn single-tree, draft bar or the like. Such shackles usually consist of an open-ended or a substantially U-shaped loop and a shackle bolt adapted to close the loop when passed through eyes in the ends of the loop.

The object of our invention is to provide an improved shackle and shackle bolt which may be readily assembled and locked in operative position so as to be incapable of separation during use but easily uncoupled at will.

With this object in view our invention consists in providing interlocking members on one end of the shackle bolt and on the adjacent eye portion of the open loop. These interlocking members are adapted to come into operative relation when the bolt is passed through the eyes and rotated on its axis through part of one turn.

In the accompanying drawings we have shown an illustrative embodiment of the invention but we do not wish to be understood as limiting ourselves to the construction shown except as required by the terms of the appended claims.

Referring to the drawings.

Figure 1:
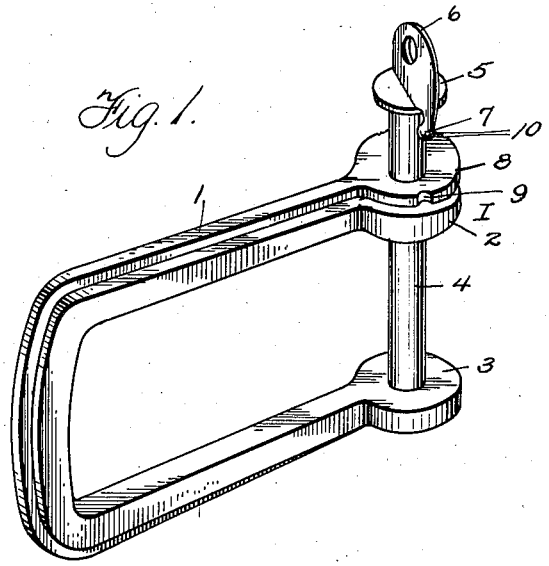
Fig. 1 is a perspective view of our improved shackle and shackle bolt, partially assembled.

Referring to the drawings in detail, 1 is an open-ended or substantially U-shaped loop of any suitable material, form and dimensions. The loop 1 is provided with enlarged ends 2, 3 having eyes through which the shackle bolt 4 is adapted to be passed to close the loop.

The shackle bolt is provided with a head 5 having a projection 6 which terminates in a hook 7. On the enlarged end 2 an annular flange 8 is formed having a cut out portion or notch 9.

In assembling the parts of the shackle the hook portion 7 of the shackle bolt will pass through the notch 9 and upon rotating the bolt 4 on its axis the projection 6 will pass over or embrace the flange 8, the hook 7 engaging the inner face of the flange and preventing axial movement of the bolt.

Figures 2, 4:
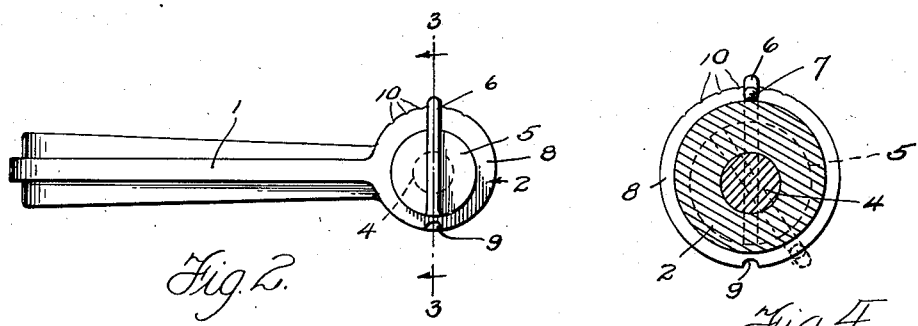
Fig. 2 is a side elevation of the same, fully assembled.
Fig. 4 is a sectional view on line 4—4 of Fig. 3.
Figure 3:
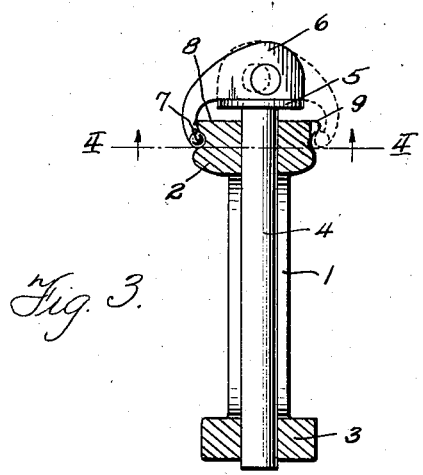
Fig. 3 is a sectional view on line 3—3 of Fig. 2.

In order to prevent accidental rotation of the bolt 4 during use we prefer to make the flange 8 or the groove adjacent thereto, or both, eccentric to the axis of the bolt in the manner shown most clearly in Figs. 3 and 4. It will be observed that the radius of the flange at the notch 9 is less than the radius diametrically opposite the notch and that when the hook 7 is rotated away from the notch it comes into wedging engagement with the flange 8 thus securely holding it in position.

As an additional guard against accidental rotation of the bolt we may provide one or more shallow notches 10 which will effectively engage the hook projection and limit turning of the bolt during use but will not prevent intentional turning of the bolt for the purpose of assembling or uncoupling.

Claims:

1. A shackle comprising an open ended loop having eyes in its ends, a bolt adapted to pass through the eyes, a flange on one of the members, said flange having a bearing surface eccentric to the axis of the bolt and a hooked projection on the other member adapted to embrace and engage the flange whereby rotation of the bolt forces said hooked projection into wedging engagement with the eccentric bearing surface.

2. A shackle comprising an open ended loop having eyes in its ends, a bolt adapted to pass through the eyes, a flange on one of the members, said flange being provided with one or more shallow notches and a hooked projection on the other member, said projection being adapted to embrace said flange and to engage in said shallow notches whereby accidental rotation of said bolt is prevented.

3. A shackle comprising an open ended loop having eyes in its ends, a bolt adapted to pass through the eyes, a flange on one of the members, said flange being provided with a notched bearing surface eccentric to the axis of the bolt, and a hooked projection on the other member adapted to embrace said flange in wedging relation therewith and to engage said notch whereby accidental rotation of said bolt is prevented.

4. A shackle comprising an open ended loop having eyes in its ends, a bolt adapted to pass through the eyes, a notched flange surrounding one of said eyes and eccentrically disposed thereto, and a hooked projection on said bolt adapted to embrace said flange in wedging relation therewith and to engage said notch.

The foregoing specification signed at St. Elmo Sta., Chattanooga, Tenn., this tenth (10) day of July, 1922.

EDWARD FOWLER.
JOHN V. LEWIS.

In presence of two witnesses—
 JUANITA F. McCUE,
 DWIGHT TAYLOR.